(12) United States Patent
Fahlström

(10) Patent No.: US 9,937,581 B2
(45) Date of Patent: Apr. 10, 2018

(54) WELDING HEAD AND WELDING HEAD ASSEMBLY FOR AN ARC-WELDING SYSTEM

(75) Inventor: Kennet Fahlström, Laxå (SE)

(73) Assignee: ESAB AB (SE)

( * ) Notice: Subject to any disclaimer, the term of this patent is extended or adjusted under 35 U.S.C. 154(b) by 1080 days.

(21) Appl. No.: 13/258,023

(22) PCT Filed: Apr. 1, 2009

(86) PCT No.: PCT/EP2009/053875
§ 371 (c)(1),
(2), (4) Date: Dec. 9, 2011

(87) PCT Pub. No.: WO2010/112068
PCT Pub. Date: Oct. 7, 2010

(65) Prior Publication Data
US 2013/0026149 A1    Jan. 31, 2013

(51) Int. Cl.
B23K 9/28 (2006.01)
B23K 9/18 (2006.01)
B23K 9/12 (2006.01)

(52) U.S. Cl.
CPC .............. B23K 9/188 (2013.01); B23K 9/122 (2013.01)

(58) Field of Classification Search
CPC . B23K 9/18; B23K 9/16; B23K 9/037; B23K 9/122; B23K 9/188
USPC ........ 219/136, 137.2, 137 PS, 137 R, 137.44
See application file for complete search history.

(56) References Cited

U.S. PATENT DOCUMENTS

| 2,436,387 | A |   | 2/1948  | Isaac et al. |
| 3,575,569 | A | * | 4/1971  | Mitchell et al. ................ 219/79 |
| 3,746,833 | A | * | 7/1973  | Ujiie ......................... 219/137 R |
| 3,992,565 | A | * | 11/1976 | Gatfield ............... F16L 11/121 |
|           |   |   |         |                          174/115 |
| 4,164,808 | A | * | 8/1979  | Gudmestad et al. ........ 29/564.4 |
| 4,261,231 | A | * | 4/1981  | Bleakley ....................... 81/9.51 |
| 4,902,873 | A | * | 2/1990  | Ivannikov ................ 219/137 R |

(Continued)

FOREIGN PATENT DOCUMENTS

CN       1894070 A      1/2007
CN    101058126 A     10/2007

(Continued)

OTHER PUBLICATIONS

International Search Report from Corresponding PCT Application, No. PCT/EP2009/053875.

(Continued)

*Primary Examiner* — Dana Ross
*Assistant Examiner* — Ayub Maye
(74) *Attorney, Agent, or Firm* — Edell, Shapiro & Finnan, LLC

(57) ABSTRACT

The invention relates to an electric arc-welding welding head comprising a contact device and one or more wire feeder units, the contact device encompassing an electrode assembly, the electrode assembly comprising at least two fusible continuously-fed wire electrodes arranged in a contact device. An electrically insulated duct is provided for electric insulation of at least one of the electrodes so that the electrode is electrically insulated from other electrodes in the electrode assembly. The invention also relates to an electric arc-welding contact device and an electric arc-welding welding head assembly.

12 Claims, 9 Drawing Sheets

(56) References Cited

U.S. PATENT DOCUMENTS

| | | | |
|---|---|---|---|
| 5,124,527 A | | 6/1992 | Takano et al. |
| 5,155,330 A | * | 10/1992 | Fratiello .................... 219/137 R |
| 5,714,735 A | * | 2/1998 | Offer .............................. 219/136 |
| 6,172,333 B1 | * | 1/2001 | Stava ...................... 219/137 PS |
| 6,683,279 B1 | * | 1/2004 | Moerke ...................... 219/137.2 |
| 7,495,192 B2 | * | 2/2009 | Takahashi et al. ........ 219/125.1 |
| 7,525,067 B2 | * | 4/2009 | Diez et al. ................ 219/137 R |
| 2007/0284351 A1 | * | 12/2007 | Diez et al. ................ 219/137 R |
| 2009/0050609 A1 | * | 2/2009 | Berger et al. ............ 219/121.64 |
| 2009/0188896 A1 | * | 7/2009 | Khakhalev et al. ............ 219/74 |

FOREIGN PATENT DOCUMENTS

| | | | |
|---|---|---|---|
| GB | 1400051 | | 7/1975 |
| GB | 1400051 A | | 7/1975 |
| JP | H07-236974 A | | 9/1995 |
| JP | 08224667 A | * 9/1996 | .............. B23K 9/29 |
| JP | H08-224667 A | | 9/1996 |
| JP | H10-080776 A | | 3/1998 |
| JP | 10-099969 A | | 4/1998 |
| JP | 2001-030077 A | | 2/2001 |
| JP | 2001-129669 A | | 5/2001 |
| JP | 2003-112261 A | | 4/2003 |
| JP | 3423467 B2 | | 7/2003 |
| JP | 2005-507783 A1 | | 3/2005 |
| JP | 2005-224837 A | | 8/2005 |
| JP | 2006-519103 A | | 8/2006 |
| JP | 2007-030019 A | | 2/2007 |
| JP | 2007-513779 A | | 5/2007 |
| JP | 2007-326148 A | | 12/2007 |
| JP | 2008-055506 A | | 3/2008 |
| JP | 2008-055509 A | | 3/2008 |
| JP | 2009-506893 A | | 2/2009 |
| KR | 1993-0009373 B1 | | 10/1993 |
| WO | 2007028185 A2 | | 3/2007 |

OTHER PUBLICATIONS

Australian Office Action for Australian Patent Application 2009343334 dated Aug. 22, 2013.
Australian Office Action for Australian Patent Application 2009343334 dated Dec. 12, 2013.
Australian Office Action for Australian Patent Application 2009343334 dated May 23, 2014.
Brazilian Office Action for Brazil Patent Application PI0924883-8 dated Apr. 1, 2009.
First Chinese Office Action for Chinese Patent Application 200980158562.6 dated Aug. 5, 2013.
Second Chinese Office Action for Chinese Patent Application 200980158562.6 dated Feb. 24, 2014.
Third Chinese Office Action for Chinese Patent Application 200980158562.6 dated Jul. 21, 2014.
Decision on Rejection for Chinese Patent Application 200980158562.6 dated Feb. 28, 2015.
Notification of Reexamination for Chinese Patent Application 200980158562.6 dated Dec. 22, 2015.
Reexamination Decision (No. 107607) for Chinese Patent Application 200980158562.6 dated Mar. 31, 2016.
Japanese Office Action for Japanese Patent Application 2012-502465 dated May 7, 2013.
Japanese Office Action for Japanese Patent Application 2012-502465 dated Mar. 18, 2014.
Korean Office Action for Korean Patent Application 2011-7023156 dated Jan. 8, 2015.

* cited by examiner

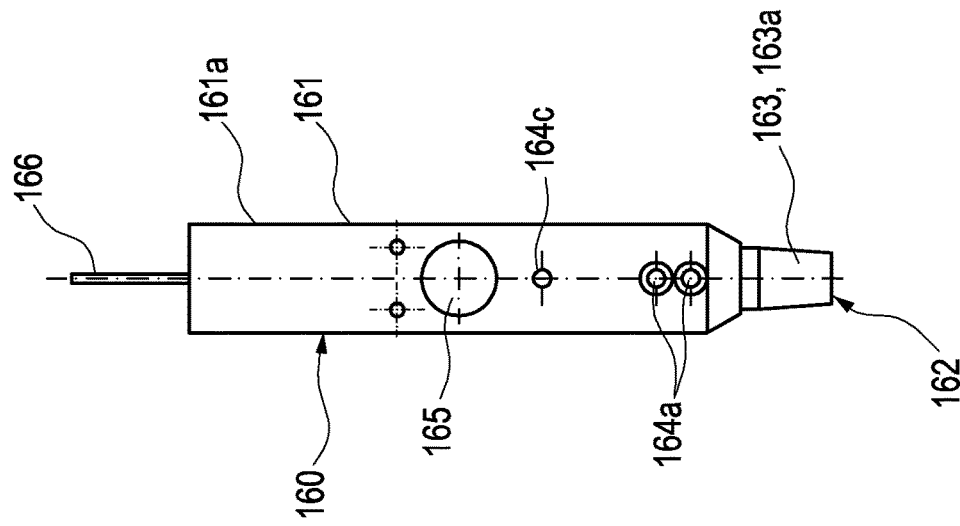
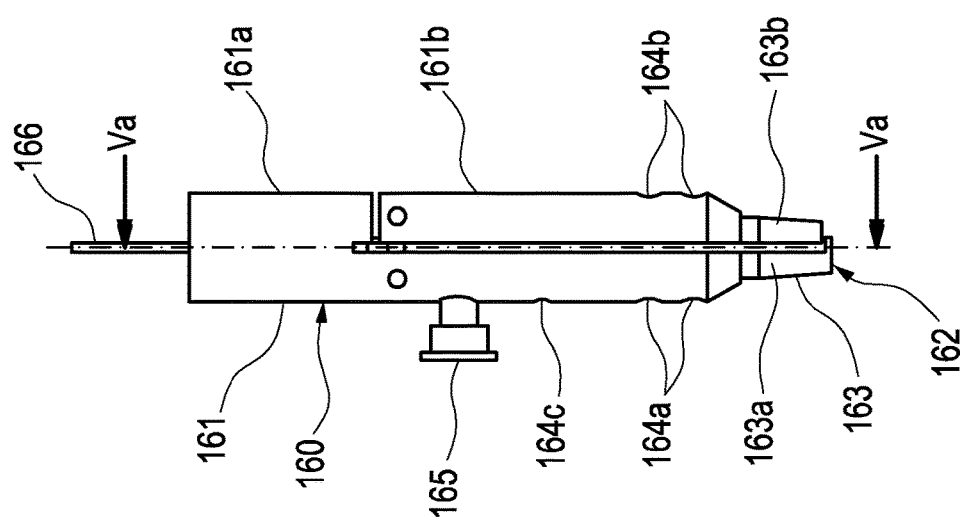
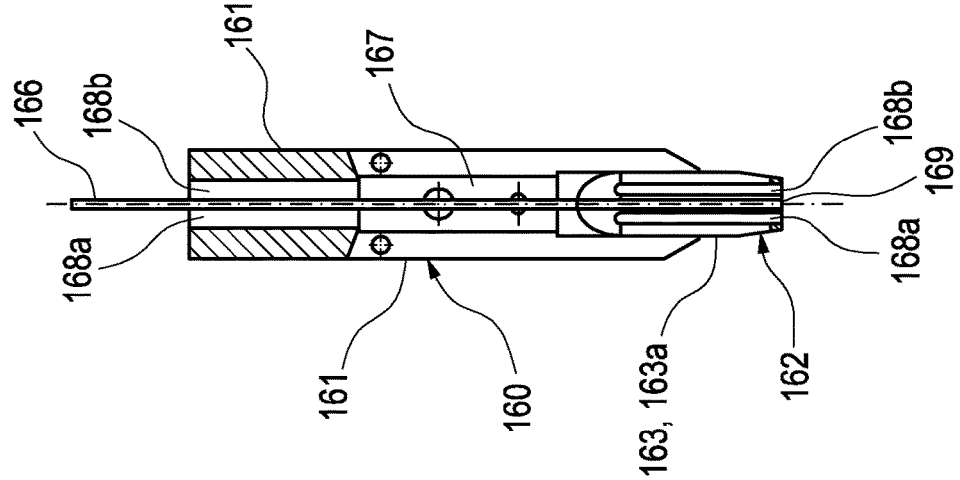

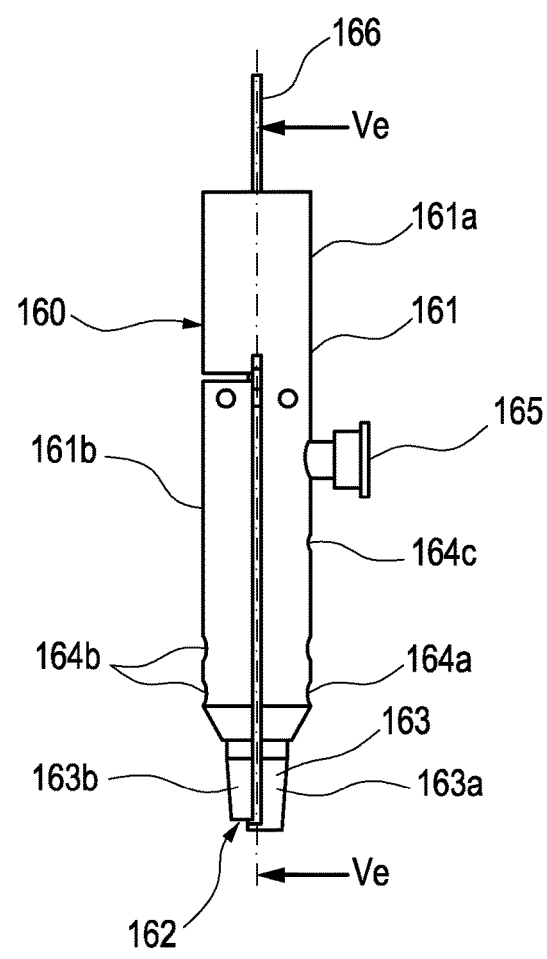
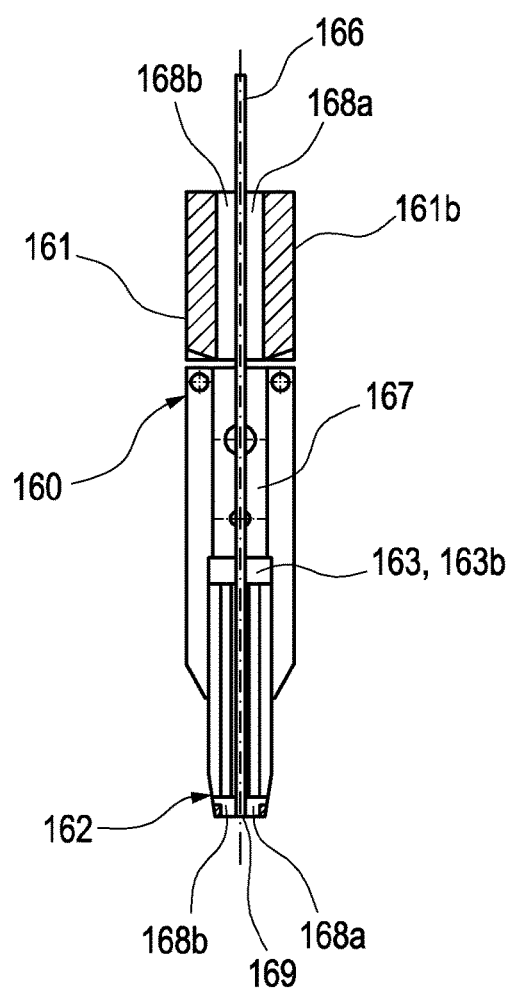
Fig. 5 d
Fig. 5 e

WELDING HEAD AND WELDING HEAD ASSEMBLY FOR AN ARC-WELDING SYSTEM

TECHNICAL FIELD

The invention relates to a welding head for an arc-welding system and a welding head assembly for an arc welding system, particularly for submerged arc welding comprising an electrode assembly with a multitude of electrodes.

BACKGROUND OF THE INVENTION

Submerged arc welding is a fully mechanised welding method characterised by high productivity and quality, often used for longer welding seems in thicker materials. During submerged arc welding one or more sequentially arranged welding electrodes melt in arcs.

The weld, particularly the melted material and the arc, are protected beneath a layer of pulverised flux. The flux melts in part during the process, thus creating a protecting layer of slag on the weld pool. The electrical current used in the process is relatively high, usually within 300-1500 Ampere per electrode. The electrodes used in submerged arc welding are usually 2.5-6 mm in diameter.

Fluxes used in submerged arc welding are granular fusible minerals typically containing oxides of manganese, silicon, titanium, aluminum, calcium, zirconium, magnesium and other compounds such as calcium fluoride. The flux is specially formulated to be compatible with a given electrode wire type so that the combination of flux and wire yields desired mechanical properties. All fluxes react with the weld pool to produce the weld metal chemical composition and mechanical properties. It is common practice to refer to fluxes as 'active' if they add manganese and silicon to the weld, the amount of manganese and silicon added is influenced by the arc voltage and the welding current level.

To find the highest productivity possible with submerged arc welding, with increased competitiveness as one result, one strives for increased weld speed and the highest possible deposition rate, i.e. melted welding consumables, or really created joint material, per hour and electrode.

One solution to this known in the art is to use multiple electrodes, positioned sequentially in the direction of the weld seem. Usually 2-3 electrodes are used, however, usage of up to 6 electrodes is known.

It is known that addition of metal which melts without an arc can improve the deposition rate during welding. For instance, metal powder or metal wires can be added during arc welding.

GB 1400051 A discloses an arrangement to improve the deposition rate during submerged arc welding of a workpiece 10. The general principle is illustrated in FIG. 1. Three continuously fed wire electrodes 30, 36, 40 serially disposed along a weld seam are consumed in arcs while moving in a welding direction 20. The electrodes 30, 36, 40 are also known as "hot" or "hot wire" electrodes. Two additional electrodes 32, 38 consumed without forming arcs are continuously fed into the molten weld pool 12 in the region of the arc of the middle electrode 36. These additional electrodes 32, 38, also known as "cold wires" or "cold wire electrodes" are in continuous short-circuit contact with the weld pool 12. The two electrodes 32, 38 consumed in the molten weld pool 12 without the formation of arcs are melted by resistance heating as well as by the heat generated by the middle electrode 36. The process uses a flux to generate protective gases and slag, and to add alloying elements to the weld pool 12. An additional shielding gas is not required. Prior to welding, a thin layer of flux powder is placed on the workpiece surface. The arc moves along a joint line in welding direction 20 and as it does so, flux is fed to the welding area by a flux feed hopper. As the arc is completely covered by the flux layer, heat loss is extremely low. This produces a thermal efficiency as high as 60%, compared with 25% for manual metal arc. There is no visible arc light, welding is virtually spatter-free and there is no need for fume extraction.

Even though the above mentioned solutions increase the deposition rate during welding it is desirable to provide a better handling of such cold electrodes.

SUMMARY OF THE INVENTION

It is an object of the invention to provide an electrode assembly which allows for improved welding speed. Another object of the invention is to provide a method with an improved welding speed in conjunction with a satisfying weld quality. Another object is to provide an apparatus for performing such method.

The objects are achieved by the features of the independent claims. The other claims and the description disclose advantageous embodiments of the invention.

According to a first aspect of the invention, an electric arc-welding welding head is proposed comprising a contact device and a feeding portion, the contact device encompassing an electrode assembly, the electrode assembly comprising at least two fusible continuously-fed wire electrodes arranged in a contact device. An electrically insulated duct is provided for electric insulation of at least one of the electrodes so that the electrode is electrically insulated from other electrodes in the electrode assembly in the contact device.

The electrically insulating duct comprises insulated portions in wire feeder and wire straightening units as well as guiding tubes outside the feeder and straightening units. The duct can be composed of a multitude of electrically insulating sections along the electrically insulated electrode from a wire reservoir such as a wire bobbin to the contact device close to the workpiece to be welded. Preferably, the electric arc-welding head is employed for submerged arc welding. Submerged arc welding can be operated as a fully-mechanised or automatic process, optionally it can be semi-automatic. Typical welding parameters are current, arc voltage and travel speed which all can affect bead shape, depth of penetration and chemical composition of the deposited weld metal from the electrodes.

Favourably, the welding head is compact and allows for an independent manipulation of the at least one electrically insulated electrode compared to the other electrodes in the electrode assembly of the welding head. The electrodes can be supplied by rear mounted wire bobbins on a so called "column and boom" arrangement. A column and boom is a rail moving manipulator which carries the welding head. The column and boom is used to position the welding head to the weld groove. The column and boom could also be designed to carry the welding equipment such as power sources, flux handling equipment and electrode coils as known in the art of arc-welding systems. Preferably, the electrically insulated electrode is a "cold wire" electrode which can be fed through a spring-loaded contact-device inside a ceramic tube. The one or more hot wire electrode and the cold wire electrode can have separate wire feeders, making this a non-synergetic set-up, offering a much wider weld parameter window compared to a synergetic set-up.

Using a cold wire electrode in combination with a one or more hot wire electrodes offers the possibility to deposit about the same volume as with three hot wire electrodes with the additional benefit of a reduced heat generation, as the cold wire electrode only "melts" down into the weld pool and thus lowers the temperature. This in turn allows for a different heat impact on the weld workpiece which in many cases is highly beneficial and opens up for higher productivity. The increase in deposition rate can be above 20%, with a prospect to an increase of productivity of almost 50% with optimized welding parameters. The invention allows for higher deposition rates without increasing the welding speed. Expediently, the invention allows for retrofitting existing welding systems, particularly for welding of large workpieces such as pipe-mills.

According to a favourable embodiment of the invention, the electrically insulated duct can comprise an electrically insulated wire conduit in the contact device. The insulated wire conduit can be a ceramics tube arranged in the contact device. The ceramics tube can be inserted in the contact device or a part of the contact device can be treated, e.g. oxidized, to form an oxide of sufficient thickness for electrical insulation.

According to a favourable embodiment of the invention, the electrically insulated duct can comprise an electrically insulated portion in a wire straightening unit for straightening one or more of the electrodes. The hot and cold electrodes can be manipulated in the same wire straightening device.

According to a favourable embodiment of the invention, an individual wire straightening unit can be provided for the electrically insulated electrode separate from wire straightening units of other electrodes of the electrode assembly. Advantageously, the electrically insulated electrode can be manipulated independently from other, particularly hot wire electrodes.

According to a favourable embodiment of the invention, the electrically insulated duct can comprise an electrically insulated portion in a wire feeder unit for feeding one or more electrodes towards a workpiece. The hot and cold electrodes can be manipulated in the same wire feeder device.

According to a favourable embodiment of the invention, an individual wire feeder unit can be provided for the electrically insulated electrode separate from wire feeding units of other electrodes of the electrode assembly. Advantageously, the electrically insulated electrode can be manipulated independently from other, particularly hot wire electrodes.

According to a favourable embodiment of the invention, an individual speed control unit can be provided for the electrically insulated electrode separate from speed control unit of other electrodes of the electrode assembly. Advantageously, the electrically insulated electrode can be manipulated independently from other, particularly hot wire, electrodes.

Favourably, the electrically insulated electrode can be fed independently from other electrodes in the contact device. This allows for a comfortable control of the welding process. The electrically insulated electrode, being a cold wire electrode, can be fed with a different speed, particularly with a variable speed and/or with a different diameter, independent from other electrodes in the contact device.

According to a favourable embodiment of the invention, the electrode in the electrically insulated duct can be arranged in sequential order between a leading and a trailing electrode with respect to a welding direction on a workpiece. The order of the electrically insulated electrode can be used to adjust the welding deposition rate. Such a symmetric arrangement can yield very high deposition rates. The sequential order of the electrically insulated electrode can be chosen depending on welding requirements.

According to a favourable embodiment of the invention, the electrode in the electrically insulated duct can be arranged upstream of the other electrodes of the electrode assembly with respect to a welding direction on a workpiece. Depending on welding requirements the sequential order of the electrically insulated electrode can be chosen. A benefit of an asymmetric arrangement of the electrodes is that the cold wire can be more easily controlled in case any kind of adjustment of an angle of approach is required. The outermost electrodes can be tilted to a desired angle compared to the other electrodes. An asymmetric arrangement particularly allows adjusting such an angle in a straightforward manner.

According to a favourable embodiment of the invention, the electrode in the electrically insulated duct can be arranged downstream of the other electrodes of the electrode assembly with respect to a welding direction on a workpiece. The sequential order of the electrically insulated electrode can be chosen depending on welding requirements.

According to a favourable embodiment of the invention, a feeder unit and/or a straightening unit for the electrodes, other than the electrically insulated electrode, can provide a feedthrough for guiding the electrically insulated electrode through the feeder unit. Favourably, the electrically insulated electrode can pass in the feedthrough through the wire straightening unit or the wire feeder unit without interacting with these units or the other electrodes. The electrically insulated electrode can be manipulated independently from the other electrodes in the same contact device of the same welding head.

According to another aspect of the invention, a welding head assembly is proposed comprising at least two electric arc-welding welding heads, at least one of which comprises a contact device and a feeding portion, the contact device encompassing an electrode assembly, wherein the electrode assembly comprises at least two fusible continuously-fed wire electrodes arranged in a contact device. An electrically insulated duct is provided for electric insulation of at least one of the electrodes so that the electrode is electrically insulated from other electrodes of the electrode assembly. Favourably, such a welding head assembly is a powerful tool for very high deposition rates with reduced heat impact on workpieces. The welding quality can thus be improved.

According to a favourable embodiment of the invention, a first welding head can be arranged in sequential order before a second welding head so that the electrode assemblies of each welding head are aligned along a welding direction during a welding operation in sequential order. The welding head according to the invention allows for a large degree of freedom when designing such a welding head assembly.

According to a favourable embodiment of the invention, an order of the electrically insulated electrode in each electrode assembly can be the same for each welding head with respect to the other electrodes in each electrode assembly. The welding head according to the invention allows for a large degree of freedom when designing such a welding head assembly.

According to a favourable embodiment of the invention, an order of the electrically insulated electrode in one electrode assembly can be reversed with respect to an order of the electrically insulated electrode in another electrode assembly of the welding head arrangement. The welding head according to the invention allows for a large degree of freedom when designing such a welding head assembly.

According to a favourable embodiment of the invention, each electrically insulated electrode can be provided with a wire straightening unit and/or a wire feeder unit separate from wire straightening units and/or feeder units of the other electrodes of the electrode assemblies. The electrically insulated electrodes can be manipulated independently from the other electrodes and independently in each welding head thus giving a large degree of freedom in adapting welding parameters for particular welding requirements imposed by material and/or geometry and/or ambient conditions of the workpieces to be welded.

According to another aspect of the invention, an electric arc-welding contact device for an electric arc-welding head and/or a welding head assembly is proposed, comprising a device body and an electrically insulated portion for guiding an electrode in an electrically insulated way through the contact device and at least one duct for at least another electrode which is in electrical contact with the device body. Favourably, a compact device is provided where one or more electrically insulated electrodes can be employed together with one or more non-insulated electrodes. The one or more electrically non-insulated electrodes can be provided for being consumed in arcs during welding whereas the one or more electrically insulated electrodes can be so called cold electrodes which are not consumed by arcs but are intended to melt in the weld pool during welding. The electrically insulated wire can be used with various diameters chosen independently from the other electrodes in the contact device.

According to a favourable embodiment of the invention, the electrically insulated portion can comprise an electrically insulating tube. An electrically insulating tube can be easily inserted into the device body. Expediently, the tube can be made of ceramics which provides a superior electrical insulation as well as a good heat resistance.

According to a favourable embodiment of the invention, the device body can be composed of a main part and a removable part which can be attached to the main part. An arrangement of the electrodes in a desired sequential order can be easily achieved or changed.

According to a favourable embodiment of the invention, a tip can provided at one end of the device body which has recesses for receiving the electrically insulating portion for an electrically insulating electrode and ducts for other electrodes. Favourably, the one or more electrodes and the electrically insulating portion can be arranged in the grooves of the tip in a defined way and held securely during operation.

According to a favourable embodiment of the invention, the electrically insulating portion can be arranged in a symmetric position between ducts for other electrodes. Favourably, the electrically insulated portion for guiding an electrode can be arranged between two ducts of electrodes. Such a symmetric arrangement provides a high deposition rate during welding.

According to a favourable embodiment of the invention, the electrically insulating portion can be arranged in an eccentric position in relation to ducts for other electrodes in the device body. Particularly, the electrically insulating portion can be provided during welding under a desired angle when approaching the weld pool by tilting the contact device.

According to another aspect of the invention, an electric arc-welding system is proposed for generating a weld pool in a workpiece, comprising at least one welding head or at least one welding head assembly according to anyone of the features described above. A highly versatile system can be provided which allows for easy adjustment of the welding parameters and conditions.

BRIEF DESCRIPTION OF THE DRAWINGS

The present invention together with the above-mentioned and other objects and advantages may best be understood from the following detailed description of the embodiments, but not restricted to the embodiments, wherein is shown schematically:

FIG. 5a-5e various views of a contact device for three wire electrodes with cut open views (FIGS. 5a, 5e) and side views (FIGS. 5b, 5d) and a front view (FIG. 5c);

DETAILED DESCRIPTION OF PREFERRED EMBODIMENTS OF THE INVENTION

Figure 1:
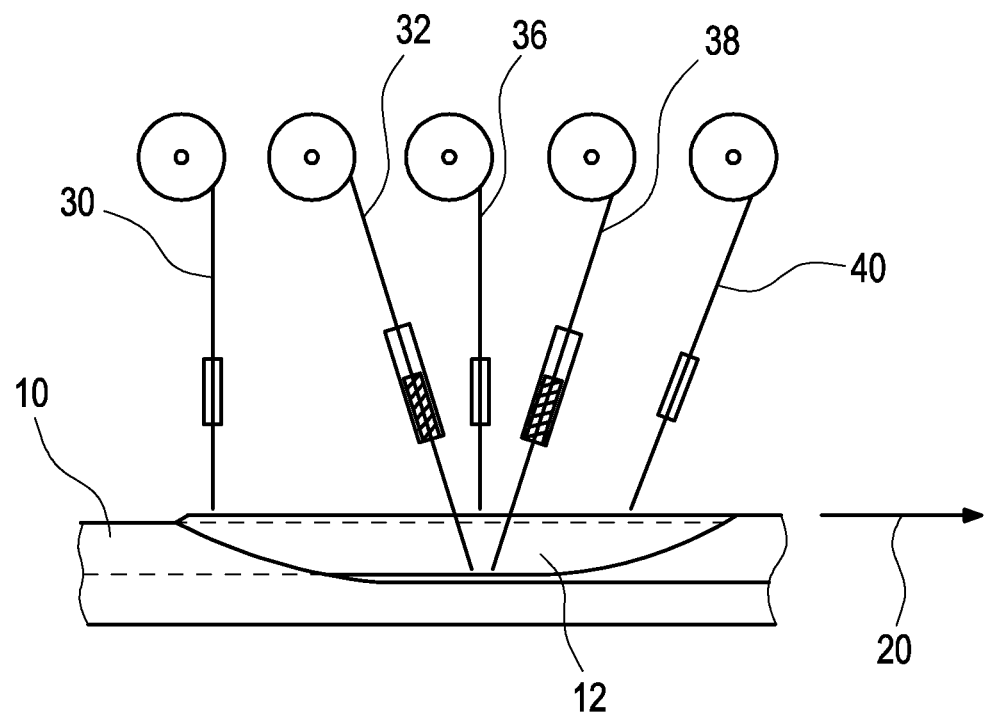
FIG. 1 a welding arrangement with hot and cold electrodes according to the prior art.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
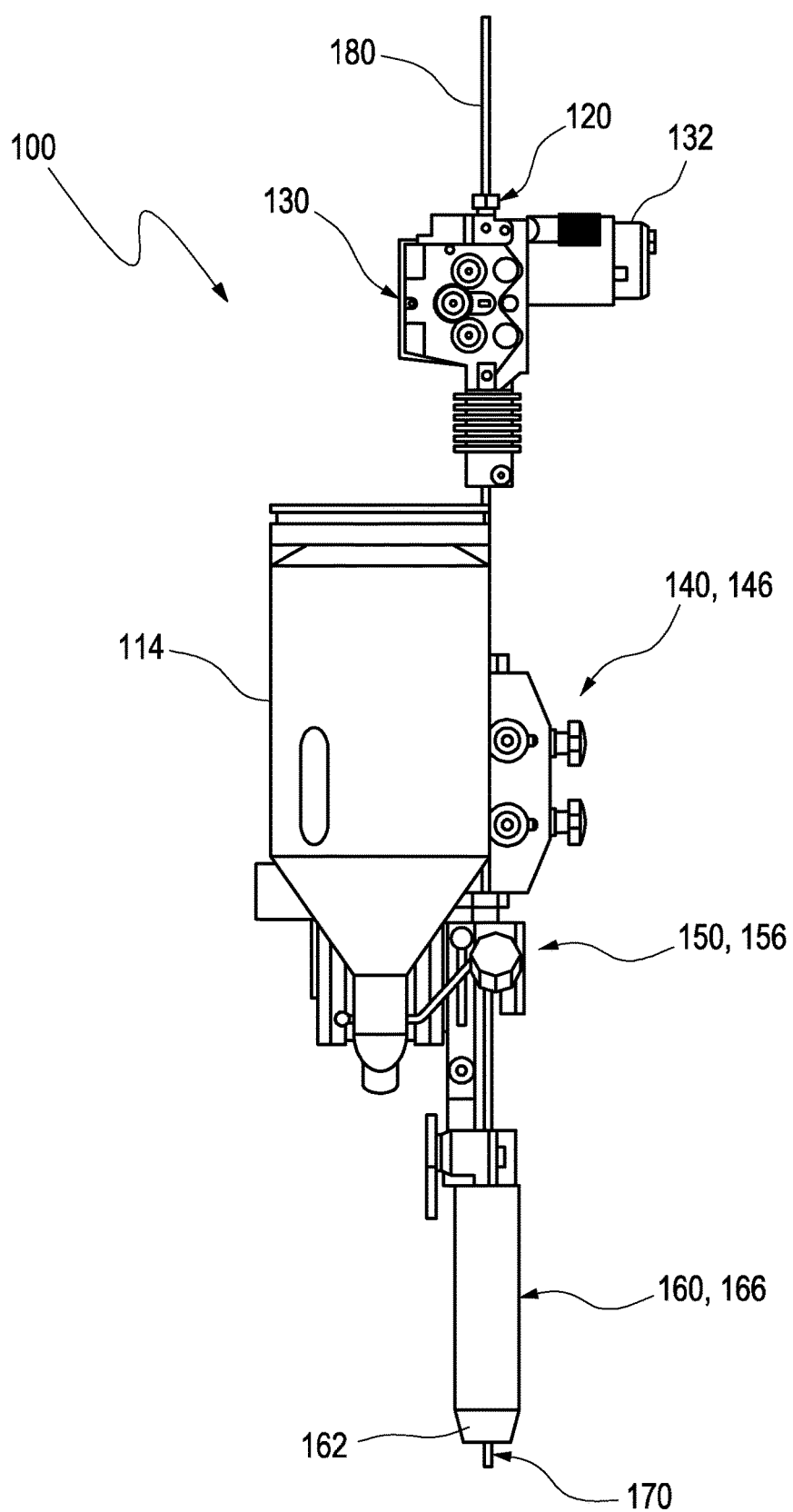
FIG. 2 a first view of an example embodiment of an arc-welding welding head according to the invention for submerged arc welding.
Figure 3:
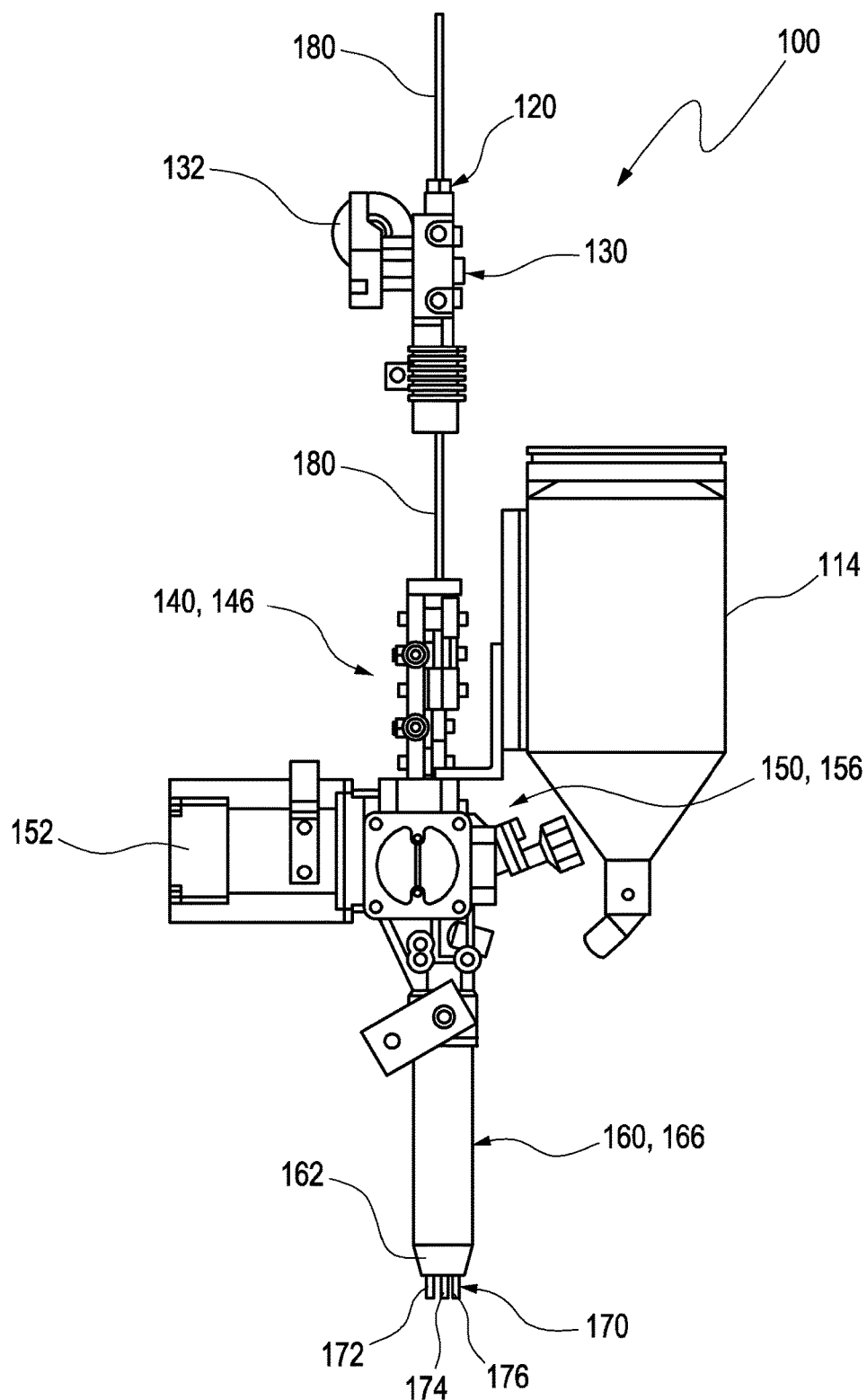
FIG. 3 the arc-welding welding head of FIG. 1 turned counterclockwise by 90°.
Figure 4:
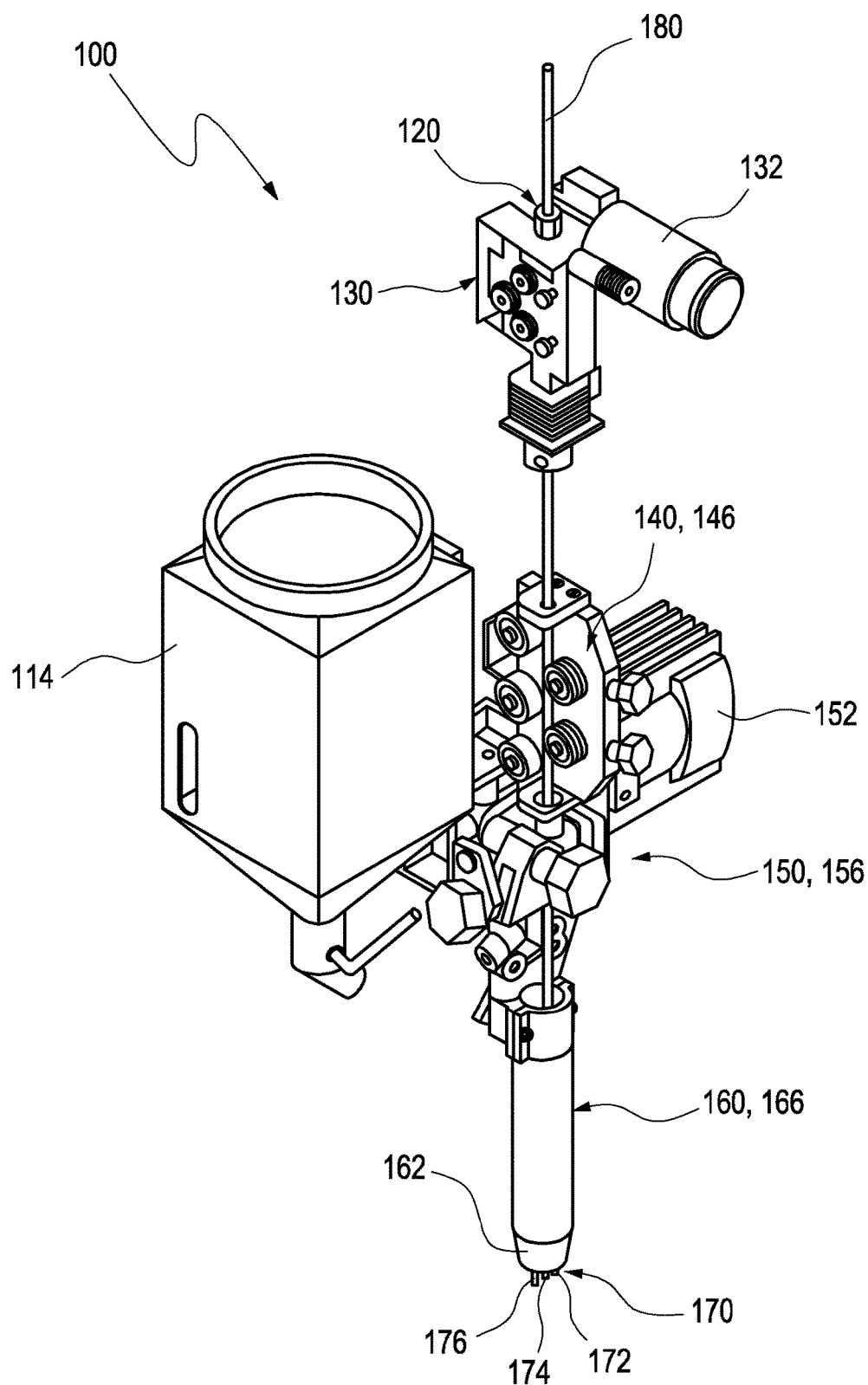
FIG. 4 a perspective view or the arc-welding head of FIG. 1.

FIGS. 2 to 4 depict different views of an example embodiment of an electric arc-welding welding head 100 according to the invention for submerged arc welding which views are described in combination.

Along its longitudinal extension the electric arc-welding welding head 100 comprises a contact device 160 at its lower end which during welding is in close proximity to the workpiece to be welded. The contact device 160 holds the electrodes 172, 174, 176 (FIGS. 3, 4) of the electrode assembly 170 of the welding head 100. The electrodes 172, 174, 176 exit the contact device 160 through an outlet 162 at the lower end of the contact device 160 which faces the workpiece during the welding operation. The wire electrodes 172, 174, 176 may be fed from respective reservoirs such as coils (not shown) towards the arc welding head 100.

The electrode assembly 170 comprises by way of example three fusible continuously-fed wire electrodes 172, 174, 176 arranged in the contact device 160. The contact device 160 comprises an electrically insulating portion 166 for an electrically insulated wire electrode 174. Only the electrically insulated electrode 174 is shown along the welding head extension. The other electrodes 172, 176 are only shown in the contact device 160. The non-insulated electrodes 172, 176 can be arranged as so called twin wires which are fed in parallel as a double wire electrode arrangement. The electrically insulating portion 166 is preferably an extra insulated wire conduit, for instance made of heat resistant material such as ceramics.

Above the contact device 160 a feeder device 150 is arranged which feeds the electrodes towards the contact device 160. Typically, the feeder unit 150 comprises grooved wheels which move the wire electrodes 172, 176 (not shown in this portion for clarity reasons) towards the contact device 160. The feeder unit 150 comprises an electrically insulating portion 156 for feeding through the electrically insulated electrode 174. The electrically insulating portion 156 can consist of feeder wheels with an extra insulated groove for the electrically insulated electrode 174. The electrically insulated electrode 174 can pass through the wire feeder unit 150 freely. The feeder wheels are driven by a driving unit 152, e.g. an electric motor.

Aside from the wire feeder unit 150 a flux hopper 114 is arranged which feeds granular flux to the contact device 160 via a nozzle (not shown) for submerged arc welding. Besides the driving unit 152 the wire feeder unit 150 comprises a gear with a drive shaft. On the drive shaft of the gear a feeding wheel 154 (FIG. 6) is arranged which can be pressurized by another wheel (not shown). The feeding wheel 154 drives the wire electrode forward in the direction of the contact device 160.

Above the wire feeder unit 150 a wire straightening unit 140 is arranged for straightening the wire electrodes 172, 176. Two rollers (not referred to with reference numbers) depicted in a foremost position of the wire straightening unit 140 are used to exert a pressure on three fixed wheels arranged vertically one over the other in the rear part of the wire straightening device. The pressure the rollers are exerting on the wheels is adjustable via knobs at the outside of the wire straightening unit 140. The pressure of the rollers on the three wheels is straightening the wire. The wire straightening unit 140 comprises an electrically insulating portion 146 through which the electrically insulated electrode 174 can pass freely through the wire straightening unit 140.

Above the wire straightening unit 140 a separate wire feeder unit 130 is disposed for feeding the electrically insulated electrode 174 towards the contact device 160. On the wire feeder unit 130 a driving unit 132, e.g. an electric motor, is arranged which drives feeder wheels of the wire feeder unit 130. Besides the driving unit 132, the wire feeder unit 130 comprises a gear with a drive shaft. On the drive shaft of the gear a feeding wheel 134 (FIG. 6) is arranged which can be pressurized by another wheel (not shown). The feeding wheel 134 drives the wire electrode forward in the direction of the contact device 160.

Above the wire feeder unit 130 a separate wire straightening unit 120 is arranged for straightening the electrically insulated electrode 174. Thus, along the longitudinal extension of the welding head 100 an electrically insulating duct 180 is provided for guiding the electrically insulated electrode 174 from a wire reservoir such as a wire bobbin (not shown) to the contact nozzle. Between the feeder units 150 and 130 and above the wire straightening unit 120 an electrically insulated wire conduit can be arranged which receives the electrically insulated electrode 174.

Particularly, the electrically insulating duct 180 consists of the electrically insulating portion 146 of the wire straightening unit 140, the electrically insulating portion 156 of the wire feeder unit 150 for the non-insulated electrodes 172, 176, and the electrically insulated portion 166 of the contact device 160 as well as electrically insulated wire conduits between and the units 130, 140, 150, 160 and above the wire straightening unit 120 for the electrically insulated electrode 174.

FIG. 5*a* to FIG. 5*e* depict various views of a contact device 160 which are described in combination. The contact device 160 encompasses a device body 161 which comprises ducts for receiving wire electrodes (not shown), wherein an electrically insulated portion 166 is one of the ducts.

By way of example the device body 161 is made of two parts 161*a*, 161*b* separated in longitudinal direction where a removable part 161*b* is attached to the main part 161*a*. The main part 161*a* has a cylindrical upper portion and a lower portion which is slightly recessed in relation to the cut through the middle (FIG. 5*a*, 5*e*). The removable part 161*b* is attached to the recessed portion of the main part 161*a* by screws.

Alternatively, the device body 161 can be a monolithic metal body with one or more bores drilled through for the passage of the wire electrodes instead of several pieces.

Between the removable part 161*b* and the main part 161*b* remains a small free distance when the parts 161*a* and 161*b* are attached to one another. The distance allows for using various wire diameters for the electrodes in the contact device 160. As the electrically insulated electrode is guided separately in the electrically insulated portion 166 the diameter of the electrically insulated electrode can be chosen independently from the diameters of the other electrodes in the device body 161.

The parts 161*a*, 161*b* of the device body 161 enclose a tip 163 which is composed of two parts 163*a*, 163*b* wherein part 163*a* is attached to the main part 161*a* and part 163*b* is attached to the removable part 161*b* of the device body 161. The parts 163*a*, 163*b* of the tip 163 can be attached to the main part 161*a* and the removable part 161*b*, respectively, by screws inserted in respective borings 164*a*, 164*b* provided in the main part 161*a* and the removable part 161*b*.

The tip 163 may have a smaller diameter than the rest of the device body 161 which may have predominantly a cylindrical shape. The electrically insulating portion 166 extends throughout the longitudinal extension of the contact device 166 and provides an outlet 169 for the electrically insulated wire electrode (not shown) at an outlet 162 of the tip 163 of the contact device 160.

As can be seen in the cut open views presented in FIGS. 5*a* and 5*e*, the device body 161 has an interior section 167 with the electrically insulating portion 166 arranged in a central position, providing an electrically insulating portion for an electrically insulated wire electrode (not shown). The electrically insulating portion 166 is preferably an insulating tube such as a ceramics tube. On both sides of the central electrically insulating portion 166 a duct 168*a*, 168*b* is provided for wire electrodes (not shown) which are intended to be consumed by arcs during welding. The ducts 168*a*, 168*b* comprise corresponding groove portions in the tip parts 163*a*, 163*b*. The groove portions form an enclosure for the wire electrodes when the removable part 161b is attached to the main part 161a of the device body 161.

At the outside of the device body 161 a bolt 165 is arranged which holds the parts 161a, 161b of the device body together by way of spring elements such as e.g. disk springs, providing a contact pressure of the parts 161a, 161b virtually independent of the actual diameter of the wire electrodes.

An electrical contact can be attached to the contact device 160 in contact portion 164c arranged in the main part 161 a of the device body 161. A wire connected to a power source can be connected to the contact portion 164c for transferring electric voltage and current to the contact device 160 so that arcs can develop at the non-insulated electrodes which are in close electric contact to the device body 161.

In the electrically insulating portion 166 the wire electrode can pass through the contact device 160 without contacting the other electrodes (not shown).

Figure 6:
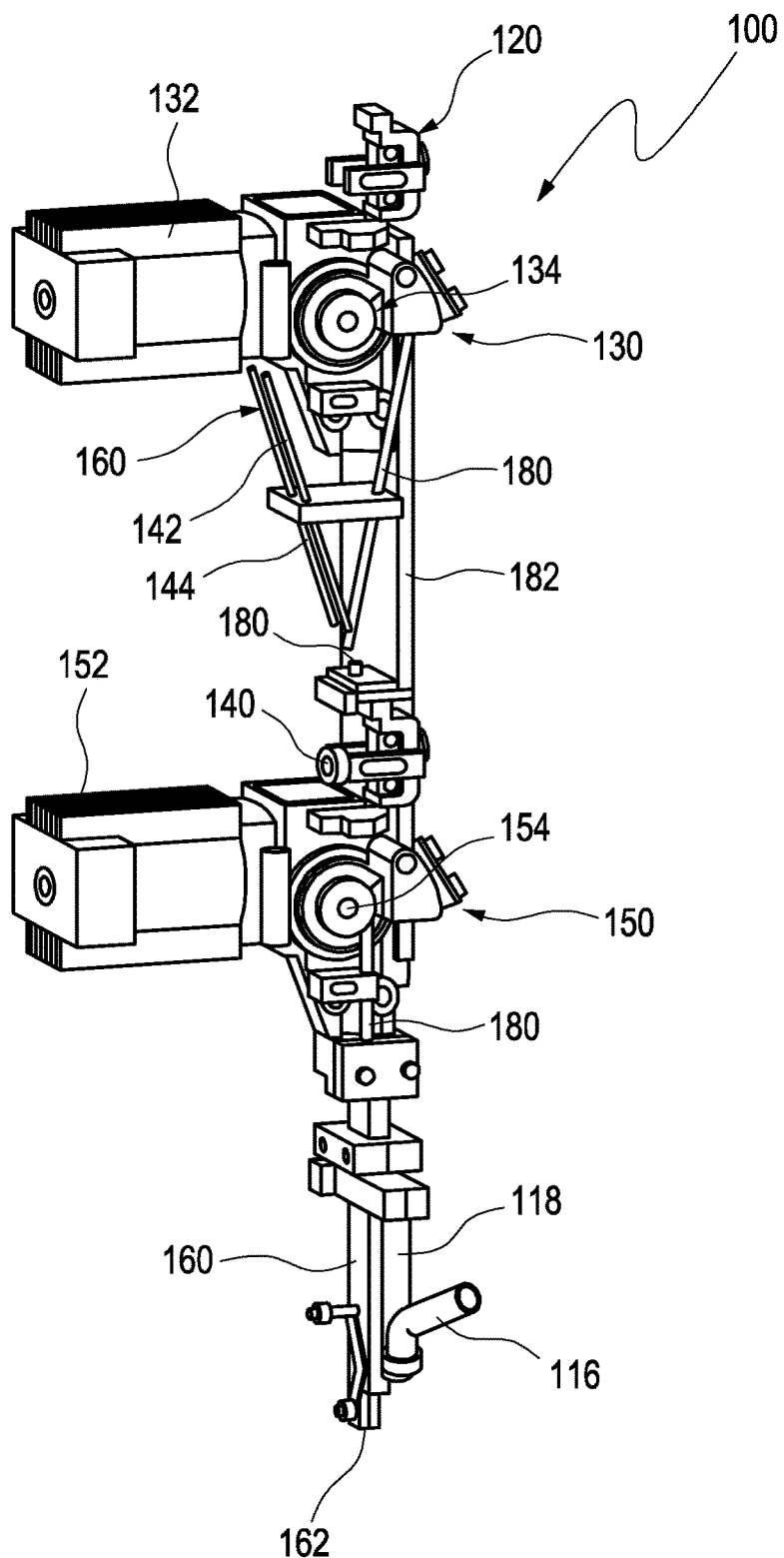
FIG. 6 a side view of an example embodiment of an arc-welding welding head

FIG. 6 is a side view of an example embodiment of an arc-welding welding head 100 of virtually the same layout as shown in FIGS. 2 to 4. In order to avoid unnecessary repetitions it is referred to these drawings for a detailed description of like elements. Above the wire straightening unit 140 two guide tubes 142, 144 are provided for twin electrodes. The guide tubes 142, 144 are arranged crosswise to the longitudinal extension of the welding head 100. Between the wire feeder unit 130 for the electrically insulated electrode (not shown) and the wire straightening unit 140 of the non-insulated electrodes (not shown) a guide tube 182 for the electrically insulated electrode (not shown) is arranged. The driving units 132, 152 can be equipped with pulse sensors for speed control of the electrodes. Close to the contact device 160 a nozzle 116 for a flux hopper 114 (FIGS. 2-4) is arranged, the nozzle 116 is fixed to a rod 116 arranged parallel to the longitudinal axis of the contact device 160.

Figure 7:
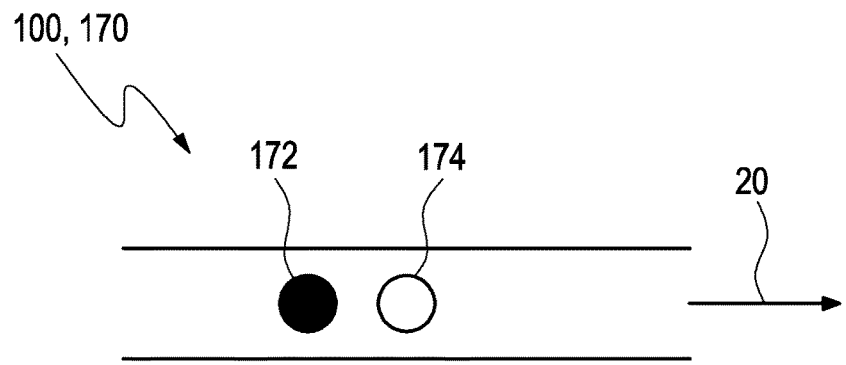
FIG. 7a-7c an arrangement of an electrically insulated electrode and a hot electrode in a first electrode assembly comprising two electrodes (FIG. 7a), a second electrode assembly comprising three electrodes with the electrically insulated electrode being the central electrode (FIG. 7b), and a third electrode assembly comprising three electrodes with the electrically insulated electrode being at the outside of the electrode assembly (FIG. 7c)
Figure 7:
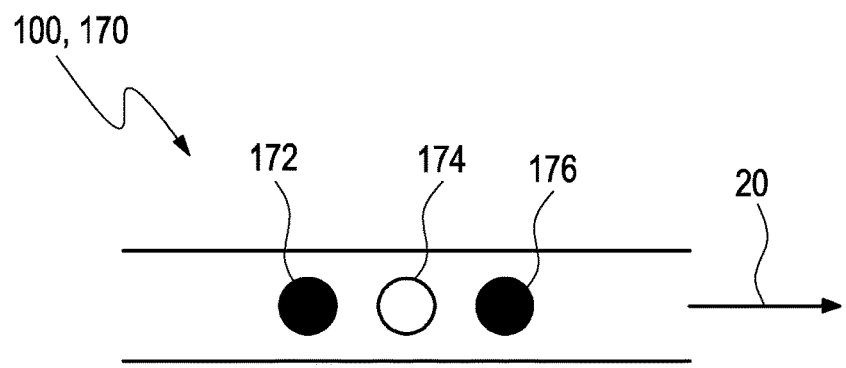
Figure 7:
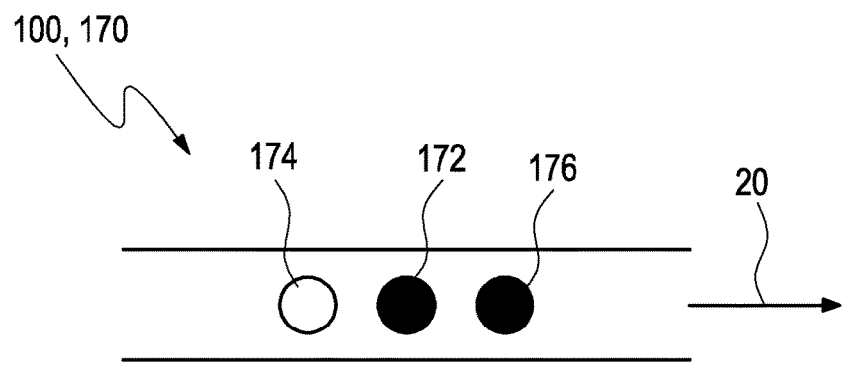

FIGS. 7a to 7c display arrangements of electrodes in electrode assemblies 170 with respect to a welding direction 20.

FIG. 7a shows a first variant of an electrode assembly 170 with an electrically insulated "cold" electrode 174 and a non-insulated "hot" electrode. A second variant of an electrode assembly 170 is shown in FIG. 7b comprising three electrodes 172, 174, 176 with the electrically insulated electrode 174 being the central electrode. A third variant of an electrode assembly 170 comprising three electrodes 172, 174, 176 with the electrically insulated electrode 174 being at the outside of the electrode assembly is displayed in FIG. 7c.

Figure 8:
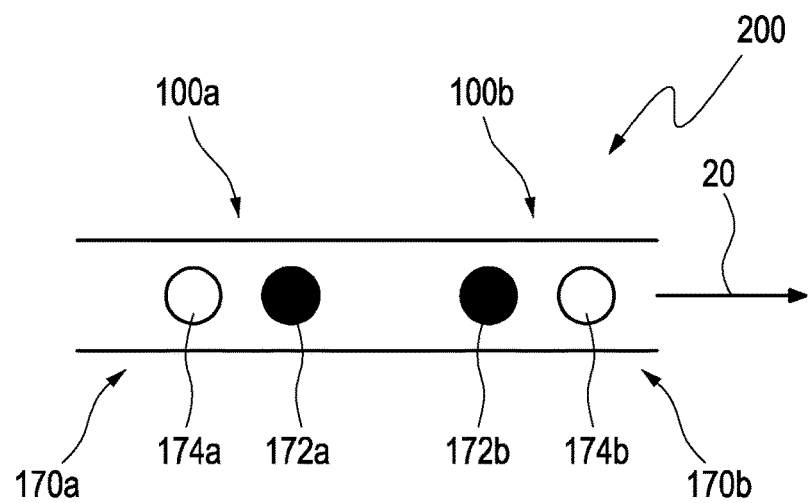
FIG. 8a-8c an arrangement of two arc-welding welding heads each comprising an electrically insulated electrode and a hot electrode in a first electrode assembly comprising two electrodes in each welding head (FIG. 8a), a second electrode assembly comprising three electrodes in each welding head, with the electrically insulated electrode being the central electrode (FIG. 8b), and a third electrode assembly comprising three electrodes in each welding head, with the electrically insulated electrode being at the outside of the electrode assembly (FIG. 8c).
Figure 8:
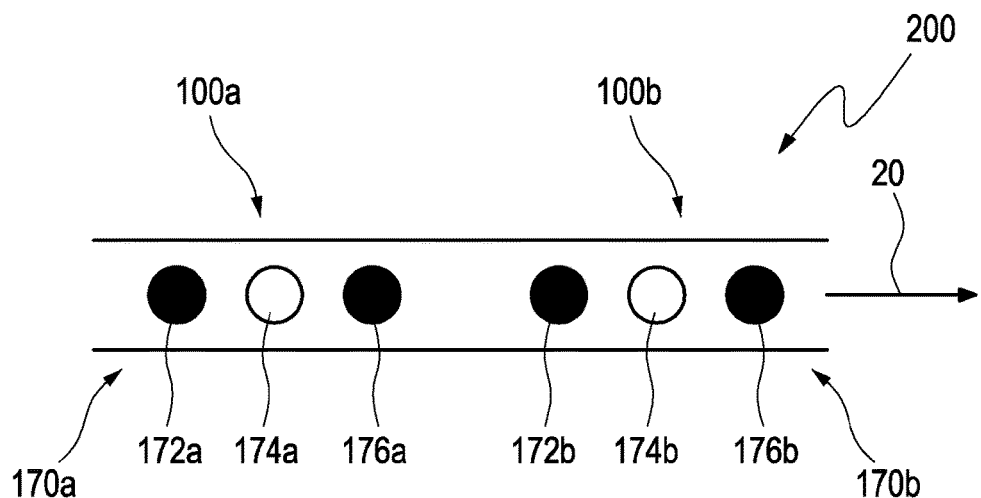
Figure 8:
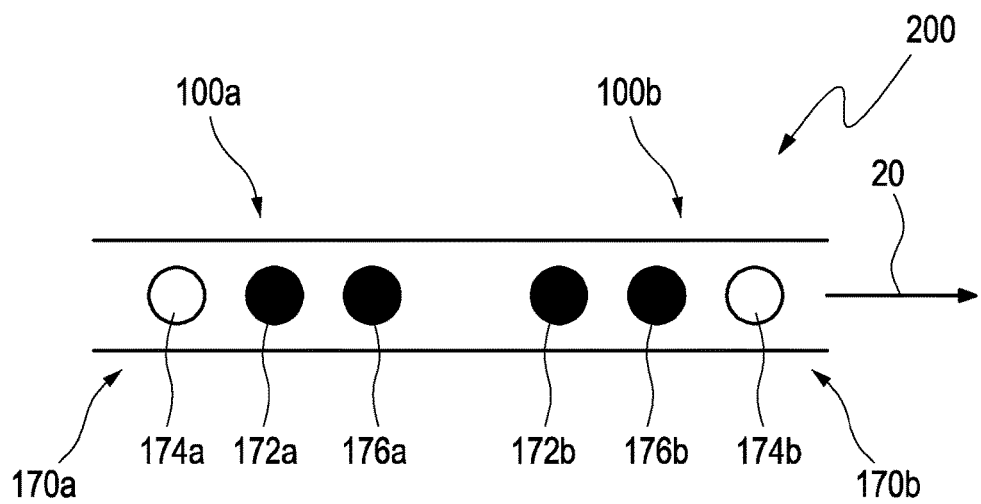

FIGS. 8a to 8c show arrangements of a welding head assembly 200 comprising two arc-welding welding heads 100a, 100b. Each welding head 100a, 100b comprises an electrode assembly 170a, 170b with an electrically insulated electrode 174a, 174b and one or more hot electrodes 172a, 172b. In a first variant of a welding head assembly 200 shown in FIG. 8a each welding head 100a, 100b comprises two electrodes 172a, 174a, 172b, 174b in each welding head 100a, 100b. The electrically insulated electrodes 174a, 174b are the outermost electrodes in the welding head assembly 200.

A second variant is shown in FIG. 8b, where each welding head 100a, 100b comprises an electrode assembly 170a, 170b with three electrodes 172a, 174a, 176a, 172b, 174b, 176b, wherein the electrically insulated electrode 174a, 174b is arranged in the middle between the two non-insulated electrodes 172a, 176a, 172b, 176b as central electrodes of each welding head 100a, 100b.

FIG. 8c shows a third variant with three electrodes 172a, 174a, 176a, 172b, 174b, 176b in each welding head 100a, 100b, with the electrically insulated electrode 174a, 174b being at the outside of the welding head assembly 200.

What is claimed is:

1. An electric arc-welding welding head comprising a contact device and one or more wire feeder units, the contact device encompassing an electrode assembly, the electrode assembly comprising a plurality of fusible continuously-fed wire electrodes arranged in the contact device, and an electrically insulated duct disposed between a pair of ducts in the contact device, the electrically insulated duct configured to provide for electric insulation of one of the electrodes so that the one of the electrodes is electrically insulated from a set of non-insulated twin-wire hot electrodes in the electrode assembly, wherein the set of non-insulated twin-wire hot electrodes is configured to be consumed in an arc during a welding operation, and the one electrically insulated electrode is a cold electrode, wherein the cold electrode is not consumed by an arc during a welding operation, and wherein the set of non-insulated twin-wire hot electrodes is disposed within the pair of ducts.

2. The welding head according to claim 1, wherein the electrically insulated duct comprises an electrically insulated wire conduit in the contact device.

3. The welding head according to claim 1, wherein the electrically insulated duct comprises an electrically insulated portion in a wire straightening unit for straightening one or more of the electrodes, the wire straightening unit including a set of rollers configured to apply a pressure on a plurality of wheels.

4. The welding head according to claim 1, wherein an individual wire straightening unit is provided for the electrically insulated electrode separate from wire straightening units of other electrodes of the electrode assembly.

5. The welding head according to claim 1, wherein the electrically insulated duct comprises an electrically insulated portion in a said one or more wire feeder units for feeding one or more electrodes towards a workpiece.

6. The welding head according to claim 1, wherein an individual wire feeder unit is provided for the electrically insulated electrode separate from wire feeding units of other electrodes of the electrode assembly.

7. The welding head according to claim 1, wherein an individual speed control unit is provided for the electrically insulated electrode separate from a speed control unit of other electrodes of the electrode assembly.

8. The welding head according to claim 1, wherein the electrode in the electrically insulated duct is in sequential order arranged between a leading and a trailing electrode of said plurality of fusible continuously-fed wire electrodes with respect to a welding direction on a workpiece.

9. The welding head according to claim 1, wherein the electrode in the electrically insulated duct is arranged upstream of the other electrodes of the electrode assembly with respect to a welding direction on a workpiece.

10. The welding head according to claim 1, wherein the electrode in the electrically insulated duct is arranged downstream of the other electrodes of the electrode assembly with respect to a welding direction on a workpiece.

11. The welding head according to claim 1, wherein at least one feeder unit of said one or more wire feeder units and a straightening unit for the electrodes other than the one electrically insulated electrode provides a feedthrough for guiding the one electrically insulated electrode through the at least one feeder unit.

12. The welding head according to claim 2, wherein the insulated wire conduit is a ceramic tube arranged in the contact device.

\* \* \* \* \*